Nov. 9, 1965 F. V. FRICKER, JR 3,216,580

MECHANICAL APPARATUS

Filed Nov. 29, 1963

INVENTOR.
FRANK V. FRICKER, JR.

BY Arthur H. Swanson

ATTORNEY.

3,216,580
Patented Nov. 9, 1965

3,216,580
MECHANICAL APPARATUS

Frank V. Fricker, Jr., Roslyn, Pa., assignor to Honeywell, Inc., a corporation of Delaware Filed Nov. 29, 1963, Ser. No. 326,839
4 Claims. (Cl. 211—41)

This invention relates to mechanical supports. More specifically, the present invention relates to support devices for retaining card-like devices.

An object of the present invention is to provide an improved card device support.

Another object of the present invention is to provide an improved card element retaining means for receiving and supporting card members in a fixed position.

A further object of the present invention is to provide an improved card element support apparatus for automatically restraining a card member in a predetermined fixed position.

Another further object of the present invention is to provide an improved card element support means having easy and rapid card insertion and removal capability.

Still another object o fthe present invention is to provide an improved card element support means, as set forth herein, having a simple operation and construction.

In accomplishing these and other objects, there has been provided, in accordance with the present invention, a unitary card element support means comprising a base member and an upper member joined by a flexible segment. The base and upper members are provided with similar card admitting grooves therein. However, the bottom of the groove in the upper member is not aligned with the bottom of the groove in the lower member and is normally disposed to interfere with the edge of a card element inserted in the groove in the lower member. The flexible segment is arranged to provide a displacement of the upper member to align the bottoms of the aforesaid grooves during the insertion of a card device. Subsequently, the flexible segment is effective to return the upper member to a normal position to cooperate with a portion of the card device whereby to retain the card element against a cooperating base means. The base means is arranged to receive the card and to mount the support means thereon in a card support apparatus. A withdrawal of the card element is achieved by displacing the upper member to realign the grooves in the upper and lower members.

A better understanding of the present invention may be had when the following detailed description is read in connection with the accompanying drawings, in which.

Figure 1:
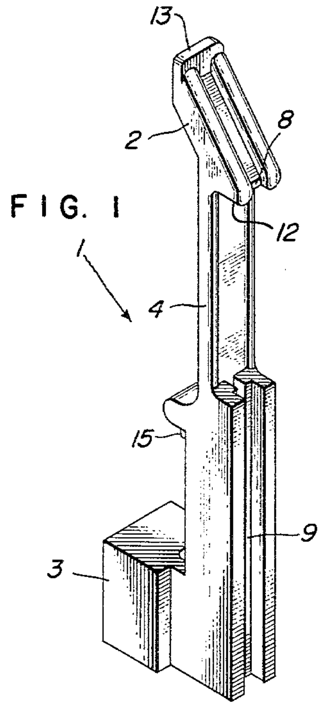
FIG. 1 is a pictorial representation of a unitary support means embodying the present invention.

Referring to FIGS. 1 an 2, there is shown a card restraining apparatus comprising a pair of unitary support means 1 each having an upper member 2 and a lower member 3. The upper member 2 is joined to the lower member 3 by a thin flexible segment 4. Each lower member 3 is attached to a base 5 by a screw means 6. The restraining means 1 are positioned on base 5 to permit a card element 7 to be disposed therebetween. The card device 7 may be any card or panel-like structure which it is desired to rigidly position on the base member in a fixed location and in a predetermined relationship. Thus, the card element 7 may be a printed circuit carrying card which is inserted into a multiple contact plug in base 5. Alternatively, card device 7 may be a photographic slide carrying card which is positioned on base 5 for projection on a screen.

Figure 3:
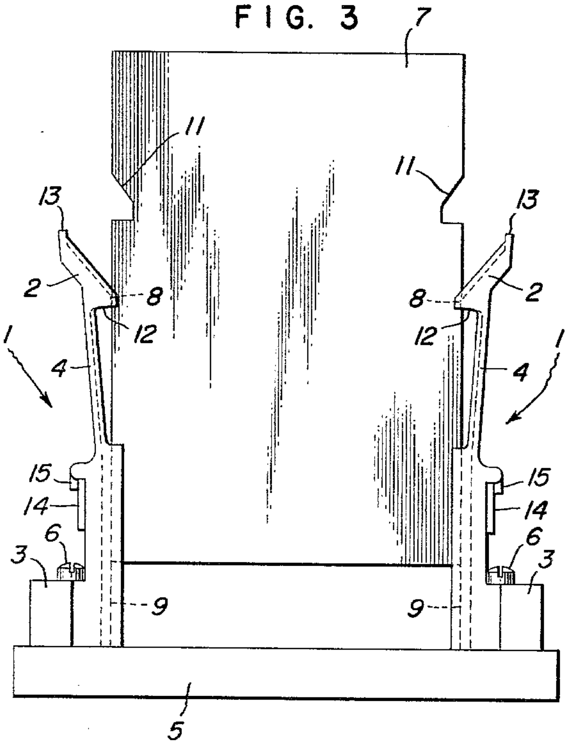
FIG. 3 is a pictorial representation of the support means apparatus shown in FIG. 2 with a partially inserted card.
Figure 2:
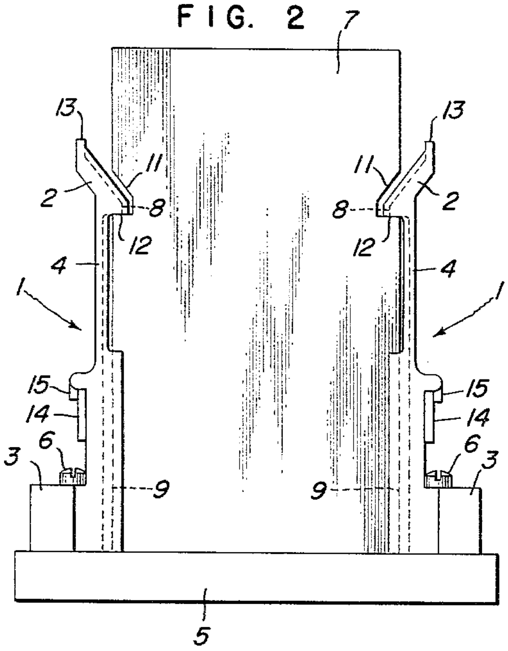
FIG. 2 is a pictorial representation of the support means shown in FIG. 1 in a card restraining apparatus and showing a fully inserted card.

The upper and lower members 2 and 3 are both provided with a groove therein to accommodate the corresponding edges of the card element 7. Thus, upper member 2 is provided with groove 8 and lower member 3 with groove 9. However, the bottom of groove 9 is at a greater depth than the bottom of groove 8. In other words, the bottom of groove 9 is not aligned with the bottom of groove 8. When the supports 1 are disposed on the corresponding sides of card 7, the separation between the bottoms of the respective grooves 9 is arranged to admit the width of card 7. Thus, card device 7 will be restrained and guided by groove 9 on each support 1 toward a final position on base 5. On the other hand, the separation between the bottoms of grooves 8 and in the upper member 2 is less than the width of the card element 7. Accordingly, during an insertion operation of the card 7, as shown in FIG. 3, the upper member 2, is displaced away from the center of the card 7. This displacement of upper member 2 is accommodated by the flexible segment 4. Further, this displacement is limited to a position wherein the separation of the bottoms of grooves 8 contacting the card device 7 is equal to the width of card 7.

Figure 4:
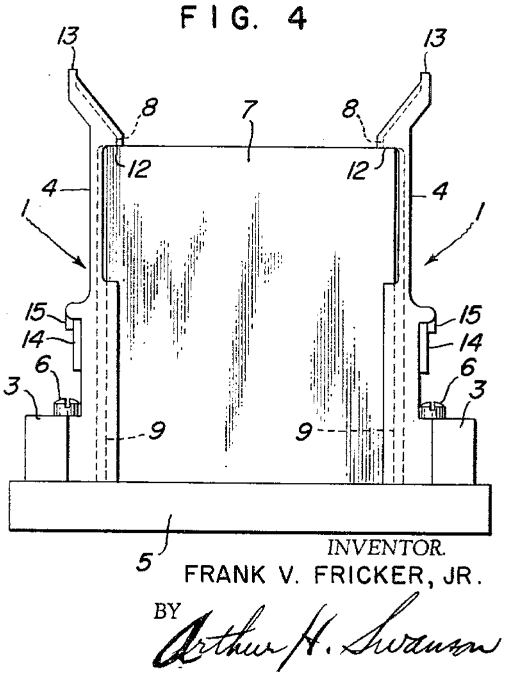
FIG. 4 is a pictorial representation of a card restraining means also embodying the present invention for use in a somewhat different manner from that shown in FIG. 2.

When the card is fully inserted, the upper members 8 may be arranged to cooperate with a pair of respective recesses 11 in the edges of the card 7. These recesses 11 are effective to allow the corresponding ones of the upper members 2 to return to a position determined by an unbent position of flexible segment 4. A bottom face 12 of upper member 2 contiguous to groove 8 is arranged to mate with the bottom edge of recess 11 to firmly lock the card 7 against the base 7. Alternatively, as shown in FIG. 4, the upper member 2 may project over the top of card 7 in a fully inserted position. In this case, the bottom edge 12 of member 2 would bear against the top edge of card 7. In either case, upon a full insertion of the card 7, the support means 1 is effective to restrain the edges of card 7 while firmly retaining it against the base 5. It is to be noted that, while two similar supports 1 are shown cooperating with respective edges of card 7, a single support means 1 could be used on one side of card 7 with a simple card edge receiving means positioned against the other edge of card 7.

In order to facilitate the release of the upper member 2 from the card 7, to allow the withdrawal of card 7, the member 2 may be provided with outwardly projecting tabs 13. A displacement of tabs 13 away from the card 7 would be effective to move member 2 to a position which would allow card 7 to be withdrawn from base 5 along grooves 8 and 9. Additionally, to even more securely retain each of the supports 1 on base 5, a rigid bar member 14 may be provided for each of the support means 1. The bar member 14 is arranged along the back of support 1 and is fastened to base 5 by any suitable means (not shown). The support means 1 are each provided on their back surfaces with a downwardly projecting extension 15 fastened at one end to the support 1, and separated therefrom by a space which is effective to permit the insertion of bar 14. Thus, each support means 1 is positioned on the bar 14 by allowing the bar 14 to pass into the aforesaid space past the unattached end of extension 15. The support 1 is then retained against the base 5 by screw 6. Using the teaching of this invention, the support means 1 may advantageously be a unity molding of a plastic material such as "Lexan." This material provides many desirable properties for the support 1 including sufficient flexibility and strength for the flexible segment 4.

Accordingly, it may be seen that there has been provided, in accordance with the present invention, a card restraining support which is effective to automatically retain a card element against a cooperating base means while allowing easy and rapid removal and insertion of the card element.

What is claimed is:

1. A card support comprising a first member having a card receiving groove therein, a second member having a card receiving groove therein and a flexible segment connecting said first and second members and separating said first member from said second member by the length of said segment with the edges of said groove in said first member in alignment with edges of said groove in said second member to form a pair of card receiving grooves while the bottoms of said grooves are not in alignment.

2. A card support, as set forth in claim 1, wherein said first member, said second member and said segment are of a unitary construction.

3. A card support, as set forth in claim 1, wherein said first member has an outwardly projecting tab for temporarily effecting a displacement of said first member with respect to said second member by the flexibility of said segment to provide a card receiving alignment of said bottoms of said grooves.

4. A card support apparatus comprising a pair of card support means arranged on respective sides of a card element, each of said support means including a first member having a card support comprising a first member having a card receiving groove therein, a second member having a card receiving groove therein and a flexible segment connecting said first and second members and separating said first member from said second member by the length of said segment with the edges of said groove in said first member in alignment with edges of said groove in said second member to form a pair of card receiving grooves while the bottoms of said grooves are not in alignment, and a base member operative to mount said card support means in facing relationship to admit and retain the opposite edges of a card element in respective ones of said pairs of grooves.

References Cited by the Examiner

UNITED STATES PATENTS

| | | | |
|---|---|---|---|
| 362,926 | 5/87 | Benninghaus | 40—17 |
| 2,220,310 | 11/40 | Wood | 40—10 |
| 2,499,049 | 2/50 | Yates | 40—10 |
| 2,909,354 | 10/59 | Bingham | 248—361.5 |
| 2,918,244 | 12/59 | Laney | 248—214 |
| 2,981,018 | 4/61 | Hopp et al. | 40—16 |
| 3,017,232 | 1/62 | Schwab et al. | 211—41 |

CLAUDE A. LE ROY, *Primary Examiner.*

FRANK L. ABBOTT, *Examiner.*